(No Model.)

J. MAGENNIS.
VELOCIPEDE DRIVING GEAR.

No. 480,600. Patented Aug. 9, 1892.

Witnesses
George E. Cruse
Edward L. Knight

Inventor
John Magennis:
By Knight Bros.
Attorneys.

THE NORRIS PETERS CO., PHOTO-LITHO., WASHINGTON, D. C.

United States Patent Office.

JOHN MAGENNIS, OF LIVERPOOL, ENGLAND.

VELOCIPEDE DRIVING-GEAR.

SPECIFICATION forming part of Letters Patent No. 480,600, dated August 9, 1892.

Application filed March 21, 1892. Serial No. 425,778. (No model.)

*To all whom it may concern:*

Be it known that I, JOHN MAGENNIS, general merchant, a subject of the Queen of Great Britain, residing at Liverpool, in the county of Lancaster, in the Kingdom of England, have invented certain new and useful Improvements in Velocipede Driving-Gears, of which the following is a specification.

My invention relates to those parts of a velocipede by which the power or force exerted by the rider is transferred to the wheel or wheels, causing the same to revolve and drive the velocipede forward. These parts are generally known as the "driving-gear" or the "driving mechanism," and the more common kinds will be recognized as those where the axle of the wheel to be driven has cranks with pedals at either end, or where pedals on the cranked axle of a sprocket-wheel cause this latter to revolve, which in turn moves forward a link chain, causing a small sprocket-wheel on the end of the axle of the wheel to be driven, to revolve, and therewith the wheel in question.

Now my invention has for its object to provide a driving-gear whereby velocipedes can be ridden at greater speeds or very much greater speeds than have hitherto been possible and that with the exertion of no greater power (indeed, if anything, with less power) on the part of the rider than at present is ordinarily needed, or else with my invention riders can drive their velocipedes at the present ordinary rates of speed, but with the exertion of very much less power than is at present needed.

In order that my invention may be fully understood, I will describe the same by aid of the accompanying sheet of drawings, on which—

Figure 1:
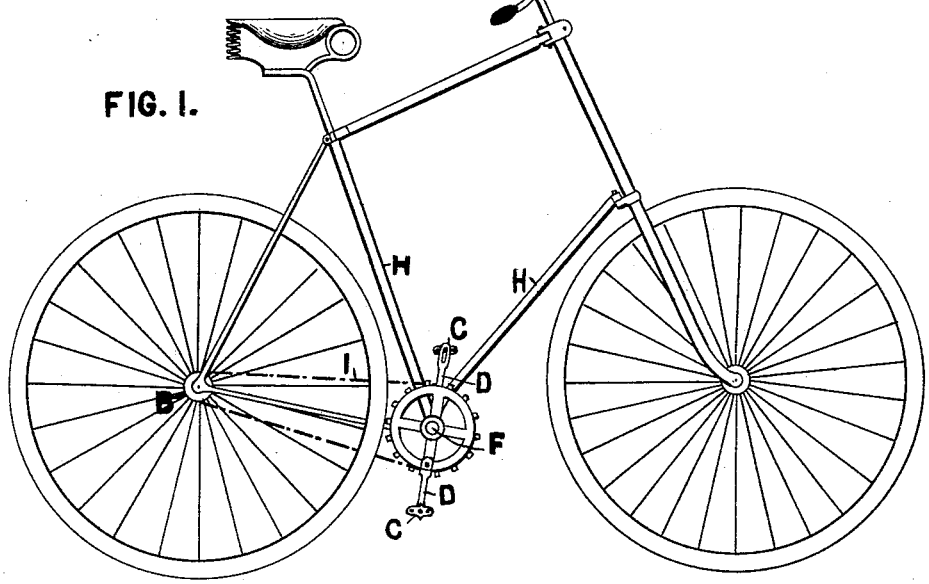
Figure 2:
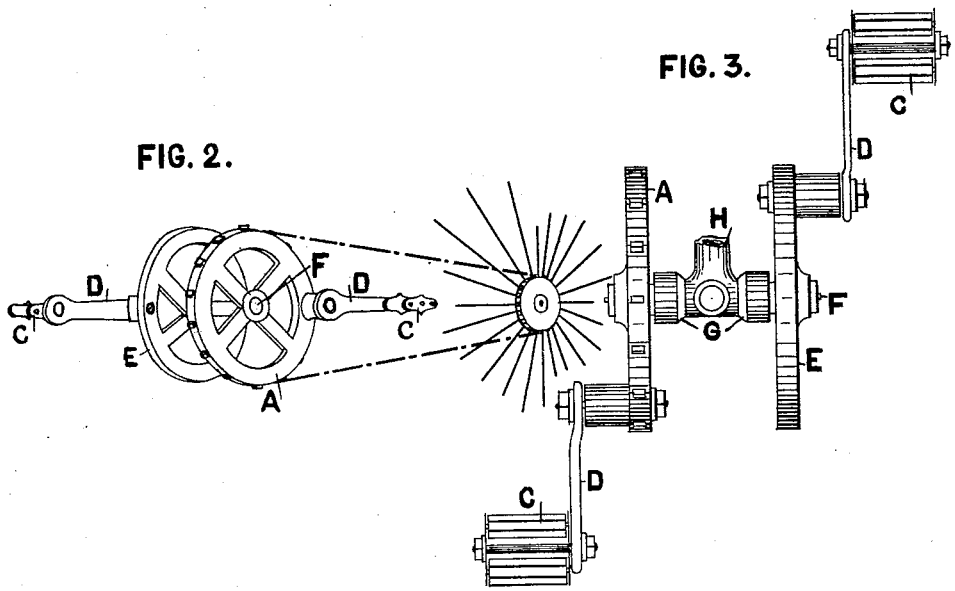
Figure 3:

Figure 1 is a side view of the commonly-known "Safety" bicycle having my invention adapted to it. Fig. 2 is a view showing complete in itself one form in which my velocipede driving-gear can be made. Fig. 3 is a plan view of the improved wheel, hereinafter fully described, of my driving-gear.

It may be here remarked that though there is shown on the annexed sheet of drawings a Safety bicycle with link-chain gearing it is not to be understood thereby that my invention is applicable to such kind only of a velocipede and to link-chain gearing only. Such has been done for descriptive purposes only, and it will become evident from the following description that any ordinary workman skilled in the art will be able to apply the invention to any kind of a bicycle, tricycle, or other foot-propelled vehicle, and whether such be propelled by chain gearing, by spur-gearing, by cranks direct, or otherwise.

According to my invention, I make the wheel to which the power of the rider is directly transmitted—that is, the forward sprocket-wheel A—of much larger diameter than is usually the case. For instance, I make it from one and a half times its ordinary size to three times its ordinary size as large again, these sizes being regulated by the speed it is desired the velocipede shall attain, as by this construction the multiplying power of the gearing is greatly increased. In the example shown on the drawings the forward sprocket-wheel A is two and a half times as large as the small sprocket-wheel B, which is a considerable increase in the proportions when compared with the present gears; but the wheel A could be of considerably-larger size where higher rates of speed are wanted.

Instead of keying or mounting in a fixed manner upon the axle the pedal-cranks, as heretofore, I do away with such cranks altogether, and I attach the pedals approximately close to the rim of the wheel, which is to be revolved by the rider's feet. By this means a more steady and direct force is attained and a correspondingly-greater amount of pressure can be exerted on the wheel in question. Where the wheel is of large size, the pedals may be inserted directly on the face of the wheel close to the rim; but to do this in the case of such a sized wheel as A would tire out the rider, owing to the small amount of throw. I therefore in those cases where the wheel is not of a specially-large size attach the pedals C C to the rim of the wheel by means of arms D D, and so still preserve the steady and direct force while providing a convenient throw for the rider's feet. As by my invention the cranks on the axle are done away, the pedals being applied approximately close to the rim of the wheel to be revolved, it becomes necessary to so arrange the driving-gear in its bearings or support that clearance will be left so that the pedals and the rider's feet can travel freely through the circular path without encountering any obstacle. It will be seen that I provide for this by arranging so that the bearing or support comes in between the two pedals. By providing two wheels A and E, of which one A is the sprocket-wheel fixed on a common axle F, this axle can be journaled into the bearing or support G in the framework H of the velocipede. Of course, if desired, both the wheels A E may be sprocket-wheels, so that one may be used when the sprockets of the other become worn out, or instead of having, as shown on the drawings, only one link chain I, causing the small sprocket-wheel B to revolve, two small sprocket-wheels might, if desired, be made use of, so that when both wheels A and E are sprocket wheels two link chains could be used for driving the two small sprocket-wheels.

When the ordinary bicycle consisting of a large front and a small rear wheel is to have my invention applied to it, such can be very easily done by enlarging the diameter of the two hubs into which the spokes of the front driving-wheel are fastened, and by attaching to the outside faces of these hubs, approximately close to their perimeter, the pedals, either directly or by means of arms, as has been hereinbefore described, while for supporting the wheel at the ends of the forks the hubs may be somewhat thicker than usual, or else have a collar on their outside faces, care being taken to leave sufficient clearance for the pedals, and large circular guides or bearings attached to the lower extremities of the forks inclose the thickened hubs or the collars, and so maintain the wheel in position.

It will be seen from the foregoing description, as has been hereinbefore mentioned, that by making the wheel which directly receives the power or force of the rider's feet much larger, in accordance with my invention, the velocipedes will run much more quickly than heretofore, while by applying the pedals to the wheel in question, instead of to its axle by means of a crank, a more steady and direct force is attained and a correspondingly-greater amount of pressure can be exerted, which is more suited to the increased size of wheel which is to be revolved.

It will of course be understood that, as in ordinary velocipedes, the faces of the wheels or hubs or the arms carrying the pedals may be slotted radially or longitudinally, respectively, to allow the amount of throw to be adjusted within reasonable limits.

I declare that what I claim is—

In a velocipede driving-gear, the combination of the common axle F, the wheels A and E, fixed thereon, either one or both of which may be sprocket-wheels, and pedals C C, attached to the rims of said wheels, substantially as set forth.

In testimony whereof I have signed my name to this specification in the presence of two subscribing witnesses.

JOHN MAGENNIS.

Witnesses:
   JOHN HAYES,
   W. H. BEESTON.